March 5, 1963

E. W. WHITE 3,080,489

PULSE GENERATOR CIRCUIT EMPLOYING DIODE AND INDUCTOR TO REDUCE CYCLE TIME

Filed Dec. 27, 1960

INVENTOR
E. W. WHITE

BY

R. C. Winter
ATTORNEY

1

3,080,489

PULSE GENERATOR CIRCUIT EMPLOYING DIODE AND INDUCTOR TO REDUCE CYCLE TIME

Elijah W. White, Berkeley Heights, N.J., assignor to Bell Telephone Laboratories, Incorporated, New York, N.Y., a corporation of New York Filed Dec. 27, 1960, Ser. No. 78,365
11 Claims. (Cl. 307—88.5)

This invention relates in general to pulse generating networks and, more particularly to circuits for permitting a high repetition rate in pulse generating networks.

Numerous prior art pulse generating circuits employ an energy storage device in the pulse forming network and a switching element bridged across the pulse forming network to intermittently provide a discharge path for the stored energy in order to produce pulses across a load device. With the advent of high speed circuit requirements, it has been found advantageous to employ, as the switching element of a pulse generator, a solid state device such as a transistor which is rapid in operation.

Such solid state devices have worked so well in pulse generating circuits that the operating speed of the switching element is no longer the limiting factor on the pulse generator repetition rate. Rather, the limitiing factor is the time required to charge the pulse forming network to the desired level.

Reduction of the charging time is complicated by the requirement of isolating the switching device from the charging circuit, as the high charging current may damage the solid state device which is generally limited in power handling capacity. Also, some types of solid state devices require a small amount of bleeder current to sustain the switch in such a condition that it can be rapidly activated. In this instance, the pulse generating circuit requires a high current charging path, a low current bleeder path, and critical timing of the elements to isolate the switching device from the high charging current. The prior art attempts to meet these requirements have either failed to achieve the high speeds desired or have achieved these speeds only by employment of costly and complicated circuitry.

Accordingly then, it is a general object of this invention to provide an improved, high speed, pulse generator circuit.

It is another object of this invention to provide a high speed pulse generator circuit capable of charging and discharging a pulse forming network while maintaining the circuit elements within safe operating limits.

It is a further object of this invention to provide a simple, rugged, and economical pulse generator circuit capable of operating at high speeds.

These and other objects of my invention are attained in one specific illustrative embodiment wherein a pulse generator circuit employs a transistor to intermittently establish a low impedance discharge path for a pulse forming network including a capacitor. The pulse generator circuit utilizes a fast acting recharge path to increase the speed of the energy storage operation, which recharge path includes isolating elements to protect the transistor from overloading due to the high charging current. Also included is a low current bleeder path to bias the transistor in a condition suitable for rapid transitions between a high and a low impedance state.

The recharge path includes a potential source and a breakdown diode to charge the capacitor to a level below a predetermined amount by conducting a heavy, reverse current through the diode, which current is set at the desired amount by adjustment of a rheostat connected between the potential source and the diode. An inductive element is connected between the diode and the capacitor

2 so that at the instant the diode reverts to a low current-carrying condition the series inductor can complete the rapid charging of the capacitor to the predetermined voltage level.

This charging of the capacitor in two steps provides a distinct advantage. The moment the diode reverts from its high current-carrying condition, the large resistance connected in parallel with the diode essentially isolates the transistor switching element from the potential source, while the decay of the field surrounding the inductor in effect discharges the inductor and assures the completion of the charging of the capacitor to the predetermined level. This last charging step thus serves to limit the duration of any high charging current in the circuit, which current would interfere with the proper avalanche action or possibly destroy the junctions of the transistor. The large resistance regulates a small amount of bleeder current which is conducted by the transistor, and with the presence of the predetermined voltage level combined with the application to the transistor of a trigger pulse of proper polarity, the impedance condition of the transistor is rapidly changed so as to provide a discharge path through a load circuit.

Thus in this specific illustrative embodiment of my invention, a breakdown diode, an inductor, and a capacitor are connected in series. The capacitor charges until the diode is back biased, at which time only a small amount of bleeder current is allowed to flow to the transistor. At the same time, the change in state of the diode allows the field surrounding the inductor to collapse, no discharge, and finish charging the capacitor to a predetermined level. A transistor bridged across the network is responsive to the predetermined charge on the capacitor, the bleeder current, and a trigger signal applied thereto to produce a discharge circuit for the network.

Accordingly, it is a feature of my invention that a pulse generator circuit having a transistor for intermittently discharging a capacitor include a charging circuit employing a Zener diode and an inductor connected between a potential source and the transistor.

It is another feature of my invention that the transistor be provided a small amount of bleeder current from a resistor connected in shunt with the Zener diode, which shunt arrangement is connected in series with the inductor.

A complete understanding of these and other features of this invention may be gained from consideration of the following detailed description together with the accompanying drawing, in which.

Figures 1, 2, 3, 4:
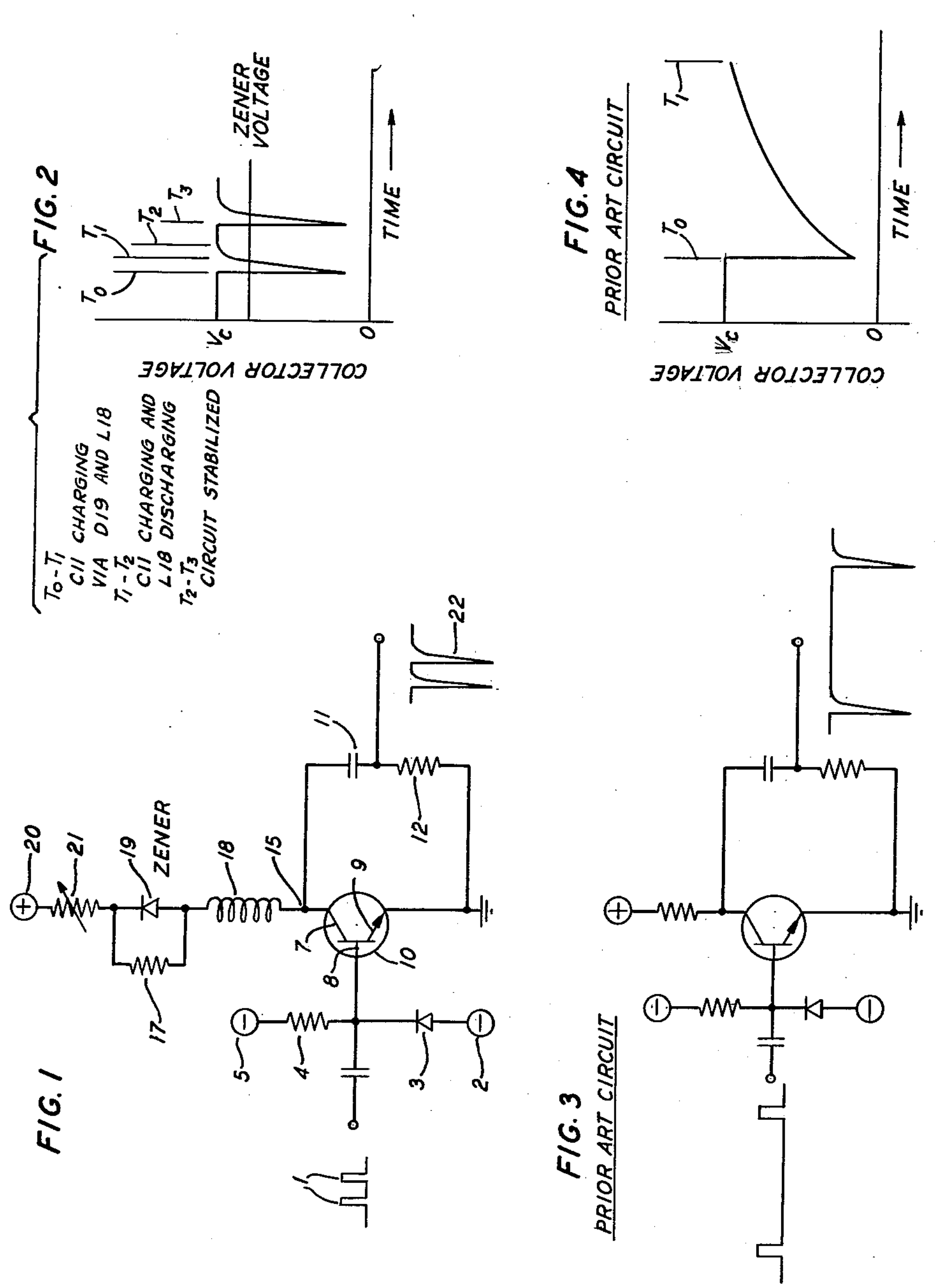
FIG. 1 is a schematic arrangement of a pulse generator circuit in accordance with one specific illustrative embodiment of the invention.
FIG. 2 is a wave form illustrating a particular portion of the operation of the pulse generator of FIG. 1.
FIG. 3 is a schematic arrangement illustrative of a prior art pulse generator.
FIG. 4 is a wave form representing a portion of the operation of the prior art circuit of FIG. 3.

Turning now to FIG. 1, a pulse generator in accordance with my invention is shown. The circuit includes a pulse forming network comprising a capacitor 11 and a load resistor 12 connected in series to ground. Transistor 10 is connected in parallel with the pulse forming network by having its emitter 9 connected to ground and its collector 7 connected to capacitor 11. This arrangement serves to establish a discharge path for capactior 11 when the transistor 10 is in its high current-carrying condition. Connected between the potential source 20 and the junction 15, which is formed by the connection of a capacitor 11 to collector 7, is an inductor 18, a breakdown diode 19, and a resistor 17 which is connected in parallel with the diode 19.

The input circuit connected to base 8 of transistor 10 comprises a negative potential source 2, a more negative potential source 5, and a diode 3 and resistor 4 which are connected in series between the two potential sources. Such a series connection establishes, by conduction through the diode 3, a low negative potential on the base 8 of transistor 10 to assure the establishment of a reverse bias condition between base 8 and emitter 9 prior to application of trigger pulses 1 to the input terminal.

The transistor 10, illustrated in FIG. 1, advantageously may be of the avalanche type described, for example, by J. J. Ebers and S. L. Miller in "alloyed Junction Avalanche Transistors," volume 34, Bell System Technical Journal September 1959, page 833. The avalanche transistor is capable of assuming either of two stable states when a voltage applied between collector and base exceeds a predetermined breakdown voltage to allow a small amount of current to flow. When such a condition is established, a triggering current of the right polarity injected into the base-emitter circuit forward biases the base-emitter junction, thereby establishing a so-called avalanche condition which causes a high current to flow in the collector-emitter circuit. This high collector-emitter current continues to flow until a current whose polarity is opposite that of the triggering current is injected into the base-emitter circuit.

Thus with respect to FIG. 1, a small amount of collector-to-base current will flow through transitsor 10 when the above-mentioned predetermined breakdown voltage level is established by the potential difference between a negative bias on base 8 and the voltage across capacitor 11. When such a condition exists the application at the input terminal of a positive polarity trigger pulse 1 of sufficient magnitude forward biases the base-emitter junction and the avalanche action mentioned above takes place. This avalanche action of transistor 10 establishes a low impedance discharge path to ground for capacitor 11, the discharge producing a sharp, high current pulse 22 through the load resistor 12.

Termination of the input trigger pulse 1, coupled with the lack of potential across the collector-emitter junction, causes transistor 10 to revert to a high impedence condition thereby establishing a series charging circuit between ground and potential sources 20, which includes the load resistor 12, capacitor 11, inductor 18, and the parallel combination of resistor 17 and breakdown diode 19.

Breakdown diode 19 is illustrated as being a Zener diode having its anode connected to inductor 18 and its cathode connected to potential source 20. Zener diodes, which are disclosed, for example, in W. Shockley Patent 2,714,702, issued August 2, 1955, are semiconductor junction devices having the characteristic that beyond a critical applied reverse voltage the current is substantially independent of the voltage. Below this critical point or Zener reverse voltage the diode presents a very high impedence.

Thus, with capacitor 11 in an uncharged condition, the voltage established across Zener diode 19 is above this critical reverse voltage so that the Zener diode in effect breaks down and exhibits a low impedence. This low impedance condition establishes a heavy current flow in the circuit including potential sources 20 and inductor 18 to charge capacitor 11, which current flow is regulated by variable resistor 21. The charging of capacitor 11 continues until the potential established at junction 15 is sufficiently high to remove, from across the terminals of Zener diode 19, the abovementioned critical reverse bias.

Zener diode 19 reverts to a high impedance state thus essentially isolating potential source 20 in order to protect transistor 10 against receipt of excessive, prolonged direct current from the source. The large amount of charging current, however, has established a high inductive field around inductor 18, and the sudden interruption of heavy current flow by the high impedance state of Zener diode 19 causes a collapse of that field thereby producing sufficient current flow to complete the charging of capacitor 11 to the predetermined level or breakdown voltage of the collector-base junction of transistor 10.

This operation also allows a small amount of bleeder current to flow from potential source 20 through resistor 17, the collector-base junction of transistor 10, resistor 4, and potential source 5. The large resistor 17 connected in parallel with the Zener diode 19 thus provides a path which regulates the collector-base current to the proper amount for rapid avalanche action to occur, which current at the same time holds transistor 10 in a stable high impedance condition to maintain the desired voltage level across capacitor 11. Upon introduction of trigger pulse 1, the avalanche transistor 10 will conduct to provide a discharge path to ground for the pulse forming capacitor 11. Obviously at this instant the voltage established across the diode is well above the Zener point, and if it should start conducting, a large amount of current would flow through transistor 10 to ground, which current, if sustained, could damage avalanche transistor 10. However, this condition never exists because the inductor 18 resists any sudden change of current flow, or is charged thereby, and in this manner provides a temporary isolation for transistor 10 from the heavy reverse current flowing through Zener diode 19. During this brief isolation period, input pulse 1 terminates causing diode 3 to be forward biased. This in turn routes sufficient current through the base 8 and emitter 9 of transistor 10 to interrupt the conductive condition in the collector-emitter path, thus re-establishing transistor 10 in a high impedance state. The above-described cycle of operation may then be repeated.

With Zener diode 19 and inductor 18 omitted, FIG. 1 would depict a pulse generator substantially of a type known in the art. Such a circuit, with the storage network capacitor charged to a predetermined level, relies on the large resistor in the collector circuit to limit the collector-base current flow necessary to prepare the transistor for avalanche conduction while at the same time protecting the transistor from high direct current. After production of an output pulse by the discharge of the storage capacitor through the load resistor, the circuit comprising the load resistor and the very large collector resistor begins recharging the capacitor. This circuit necessarily requires a large time constant for the capacitor to reach the predetermined voltage level necessary to condition the avalanche transistor for another input pulse thus severely limiting the pulse repetition rate.

The prior art circuit wherein the current-limiting resistor is connected directly between the potential source and the avalanche transistor and wherein the diode and inductor are omitted is shown in FIG. 3. The collector voltage rise time, interval $T_0$ through $T_1$, for this prior art circuit is shown in FIG. 4. In this instance the rise time between zero voltage and $V_c$, the predetermined capacitor voltage, is, as an approximation for such prior art circuits, in the order of 800 microseconds.

It is readily apparent that the severe limitation on the pulse repetition rate described above has been resolved in my invention by the provision of an inductor 18 and a Zener diode 19 connected in series between the pulse forming capacitor 11 and potential source 20, as shown in FIG. 1. Reference to FIG. 2, showing the collector voltage wave form of transistor 10, illustrates the charging sequence for the pulse generator of FIG. 1. At time $T_0$, capacitor 11 has attained the predetermined voltage level necessary for avalanche action, explained in detail hereinbefore. With the occurrence of input pulse 1, transistor 10 reverts to a low impedance state, capacitor 11 discharges through load resistor 12, and the potential at collector junction 15 drops rapidly to a low level. Thereafter, the transistor 10 in a high impedance state and Zener diode 19 conducting heavily, capacitor 11 charges rapidly toward the potential of source 20. At time $T_1$, as shown in FIG. 2, the potential difference across Zener diode 19 is no longer within the Zener range, and it reverts to a high impedance state thereby interrupting the charging current path. The collapse of the established inductive field around inductor 18 provides the current necessary during time interval $T_1$—$T_2$ to establish the predetermined voltage $V_c$ across capacitor 11. The circuit is stabilized during the time interval $T_2$—$T_3$ to await the arrival of another cycle of operation as described hereinabove.

The total charging time for capacitor 11, as shown in time interval $T_0$ through $T_2$, is approximately one-half microsecond as compared with the approximate 800 microsecond interval $T_0$ through $T_1$, shown in FIG. 4 as representing the prior art pulse generator operation.

It is to be understood that the above-described arrangement is merely illustrative of the application of the principles of the invention. Numerous other arrangements may be devised by those skilled in the art without departing from the spirit and scope of the invention.

What is claimed is:

1. A pulse generator circuit including an energy storage device, means for forwarding to said device a predetermined level of energy, said energy forwarding means comprising an energy source, a diode having a preassigned Zener point, said diode being biased off upon receipt in said device of a portion of said predetermined level of energy, and an inductive storage element connected between said diode and said device for forwarding energy to said device sufficient to complete establishment of said predetermined level, and switching means bridged across said device for intermittently removing said stored energy.

2. A pulse generator circuit in accordance with claim 1 wherein said switching means comprises an avalanche transistor.

3. A pulse generator circuit comprising a pulse forming network, an energy source, means comprising a diode for transferring a sufficient quantity of charge from said source to said network to bias said diode into a nonconducting state, switching means for removing the charge from said network after the charge reaches a prescribed level, and inductance means connected between said diode and said network, said inductance means being discharged when said diode is biased into the nonconducting state to transfer a sufficient quantity of charge to said network to reach said prescribed level and also being charged when said diode is biased into the conducting state to protect the switching means against voltage surges.

4. A pulse generator comprising a transistor, a capacitor connected to one electrode of said transistor, means for activating said transistor to discharge said capacitor, and means for recharging said capacitor comprising a Zener diode connected to a voltage source, an inductor connected between said diode and said one electrode of said transistor.

5. A pulse generator in accordance with claim 4 and further comprising resistive means in shunt with said diode for conducting biasing current to said one electrode of said transistor.

6. A pulse generator circuit including a pulse forming network, means for intermittently charging said network comprising a Zener diode, a potential source connected to one terminal of said diode, said diode having a preassigned Zener voltage point to conduct reverse current to said network to establish a voltage on said network less than a predetermined amount, and an inductor connected to the other terminal of said diode and said pulse forming network for providing additional current during a nonconductive condition of said diode for establishing the predetermined voltage at said network.

7. A pulse generator circuit in accordance with claim 6 and further comprising an avalanche transistor having collector, emitter and base electrodes, said collector and emitter electrodes connected in shunt with said pulse forming network and responsive to said predetermined charge at said collector and an input signal at said base for intermittently discharging said network.

8. A pulse generator circuit including a pulse forming network, circuit means for charging said network to a predetermined level, said charging circuit means comprising a potential source, a Zener diode having a preassigned Zener point connected to said potential source for charging said network to a level less than said predetermined level and an inductive storage element connected between said diode and said network for establishing the predetermined charge on said network, and switching means bridged across said network for intermittently discharging said network.

9. A pulse generator circuit in accordance with claim 8 wherein said pulse forming network comprises a storage capacitor and a load resistor connected in series between said inductive storage element and ground.

10. A pulse generator circuit including an energy storage device, means for intermittently forwarding energy to said device comprising a potential source, a diode of the reverse voltage breakdown type, means connected to said potential source for regulating the amount of current conducted through said diode to said device, said diode being biased off upon establishment of a charge on said device less than a predetermined level, an inductor connected between said diode and said storage device, said inductor producing a current sufficient to establish the predetermined charge on said storage device upon establishment of the biased off condition of said diode, and an avalanche transistor having collector, emitter and base electrodes, said transistor having its collector and emitter electrodes connected across said storage device and responsive to said predetermined charge at said collector and an input signal at said base for discharging energy from said storage device.

11. A pulse generator circuit including a storage device, means for establishing a predetermined potential across said storage device comprising a first potential source, a diode of the reverse voltage breakdown type connected to said potential source, said diode poled to conduct current to said storage device only to establish a potential across said device less than the predetermined potential, an inductor connected between said diode and said storage device, said inductor producing a current sufficient to establish the predetermined potential across said device upon termination of the conductive condition in said diode, a transistor having a collector, emitter and base, the collector of said transistor connected to said storage device, means for establishing current flow in the collector-base path of said transistor including a second potential source less in magnitude than said predetermined potential connected to said base, and means for maintaining said current flow through said collector-base path during the nonconductive condition of said diode, said last-mentioned means comprising a resistor connected in series with the collector of said transistor and in parallel with said diode.

References Cited in the file of this patent

UNITED STATES PATENTS

| | | |
|---|---|---|
| 2,849,626 | Klapp | Aug. 26, 1958 |
| 2,995,709 | Beardswood et al. | Aug. 8, 1961 |